Dec. 13, 1960 W. M. BUELL ET AL 2,964,071
MAGNETIC BELT DRIVE FOR BULK SALTER
Filed Jan. 31, 1957 3 Sheets-Sheet 1
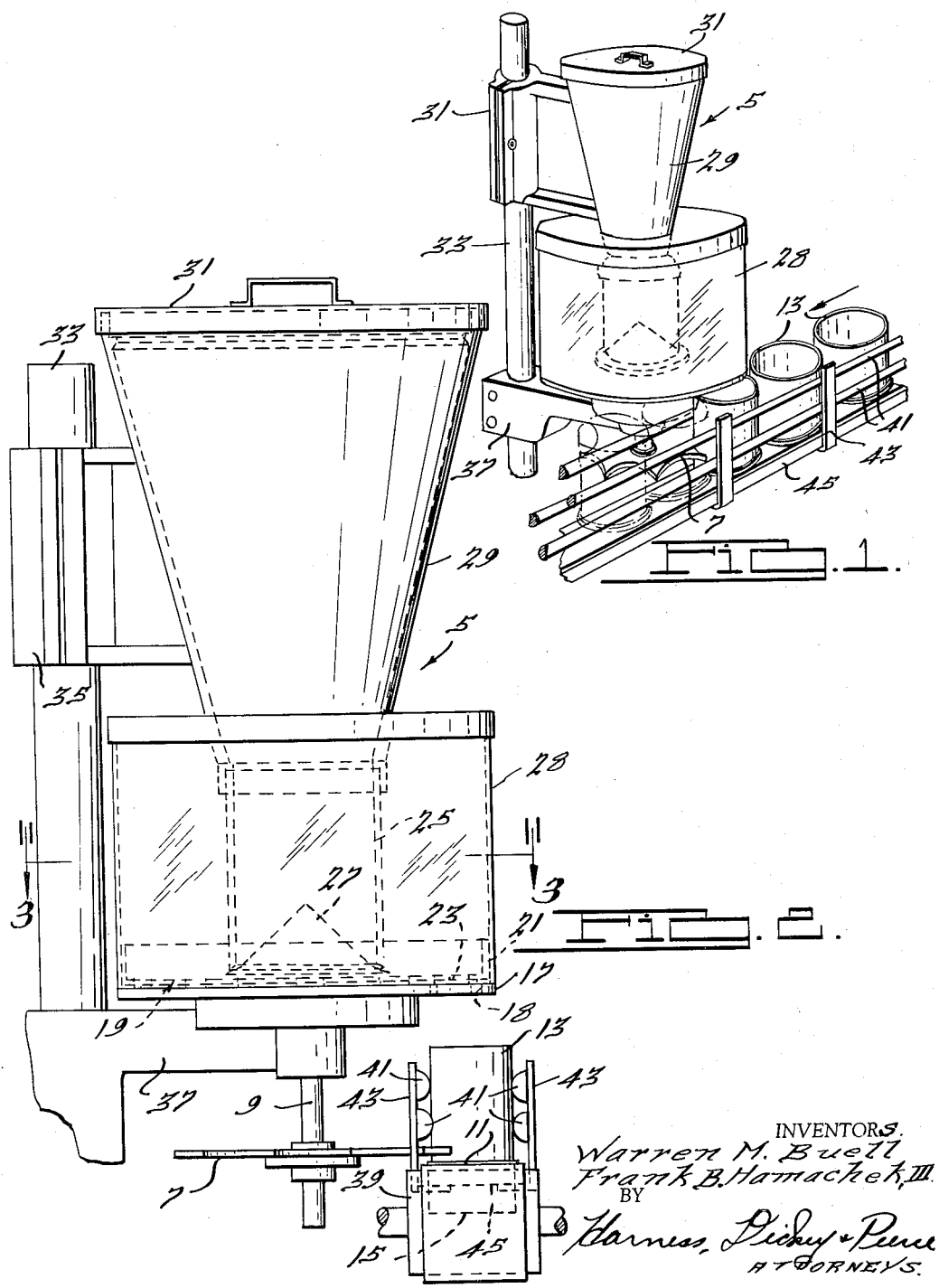
INVENTORS.
Warren M. Buell
Frank B. Hamachek, III
BY
Harness, Dickey & Pierce
ATTORNEYS Dec. 13, 1960

W. M. BUELL ET AL 2,964,071

MAGNETIC BELT DRIVE FOR BULK SALTER

Filed Jan. 31, 1957

INVENTORS.
Warren M. Buell
Frank B. Hamachek, III
BY

Harness, Dickey & Pierce
ATTORNEYS.

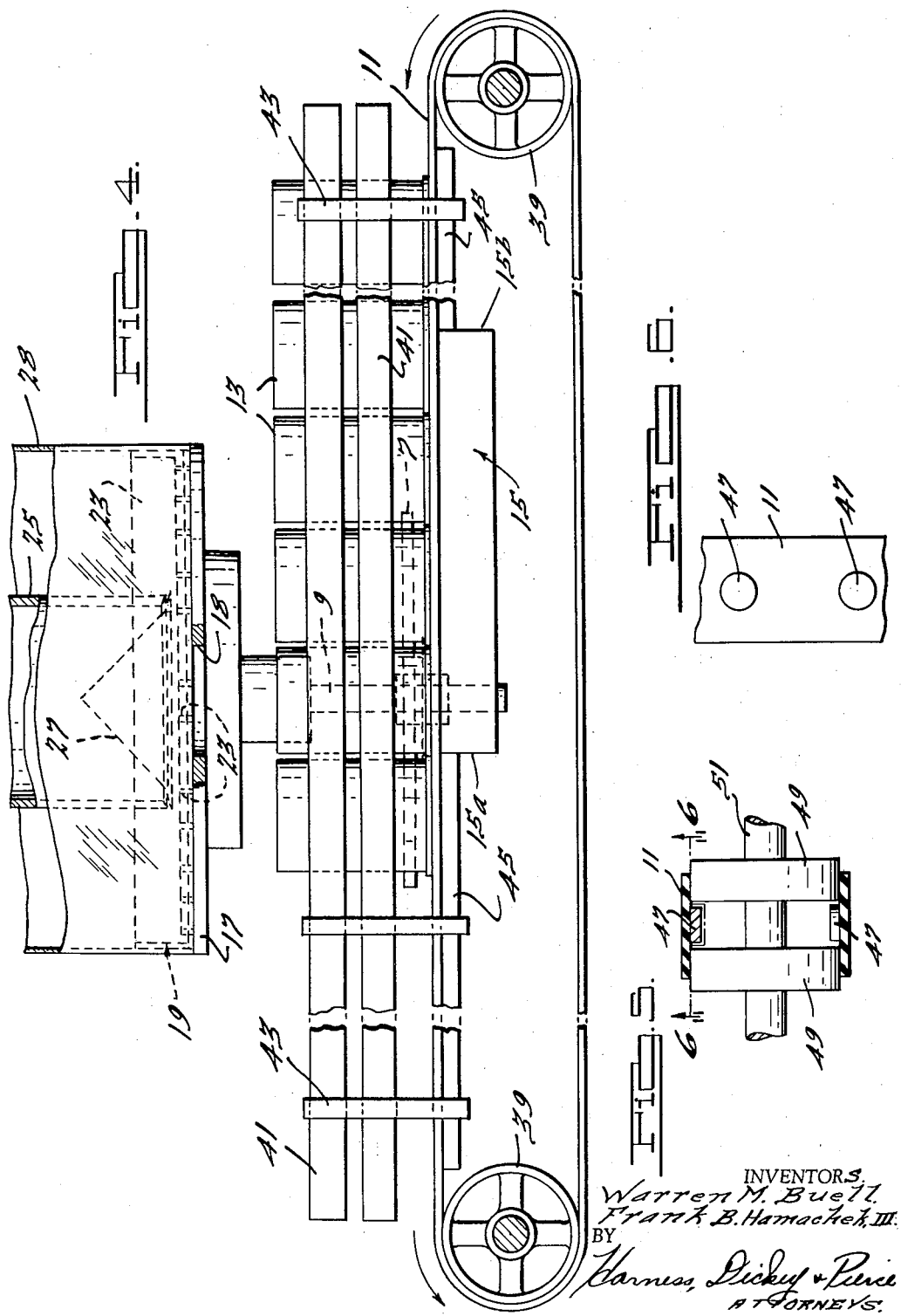

U̇nited States Patent Office 2,964,071
Patented Dec. 13, 1960

2,964,071

MAGNETIC BELT DRIVE FOR BULK SALTER

Warren M. Buell, St. Clair, Mich., and Frank B. Hamachek III, Kewaunee, Wis., assignors to Diamond Crystal Salt Company, a corporation of Michigan Filed Jan. 31, 1957, Ser. No. 637,478

7 Claims. (Cl. 141—162)

This invention relates to improvements in combination apparatus including a measuring and feeding device and driving means therefor, which measures and feeds a predetermined quantity of salt from a bulk supply into each of a plurality of cans in succession as they are fed in a moving series by a conveyor adjacent the dispensing device.

In the canning industry where it is often necessary that each can which is filled with food receive a definite and equal amount of salt it has been customary to employ a salt dispensing device and to drive the same from a positive drive taken off from a suitable place on the automatic canning machine. See for example U.S. Patent 2,705,092 to Woodruff assigned to the same assignee as the instant invention. Such is the practice to insure synchronization of the drive for the dispensing device with the demand for the cans of the canning machine. Difficulty has been encountered when the salt dispenser is positioned close to the canning machine from caking of the salt due to steam and hot fumes which evolve from the canning machine. Moving the salt dispenser to a position remote from the canning machine and driving it with a separate or synchronized drive or from a remote, direct drive has not been feasible in all cases and in others has been too costly.

The foregoing deficiencies attendant with the present practice of dispensing salt in canning operations are substantially eliminated in accordance with the present invention which has for its principal objects to provide improved driving means in combination with salt dispensing apparatus of the character indicated which permits of remote installation from the canning machine and wherein synchronization with the demand of the canning machine for the cans is automatically accomplished; to provide such combination apparatus in a form wherein the moving series of cans is positively attracted to a conveyor and wherein the cans positioned thereon and positively attracted thereto constitute the driving force for the dispensing device; to provide apparatus of the type specified which comprises a minimum of moving parts including an endless conveyor and magnetic means positioned therebeneath and adjacent the dispensing device; and to provide improved driving means for apparatus for measuring and feeding salt into each successive can of a moving series which is rugged in construction and reliable in operation.

The above and related objects will appear during the course of the following description taken in conjunction with the accompanying drawings.

In the drawings:

Figure 1 is a view in perspective of the combination apparatus embodying the invention;

Figure 2 is a side elevational view of the structure of Figure 1;

Figure 4 is a front elevational view partly in section of the structure of Figure 3.

Figure 5 is an end view partly in section illustrating a modified form of the invention; and Figure 6 is a plan view of the modified form of the invention of Figure 5 taken substantially along the line 6—6 thereof.

Figure 3:
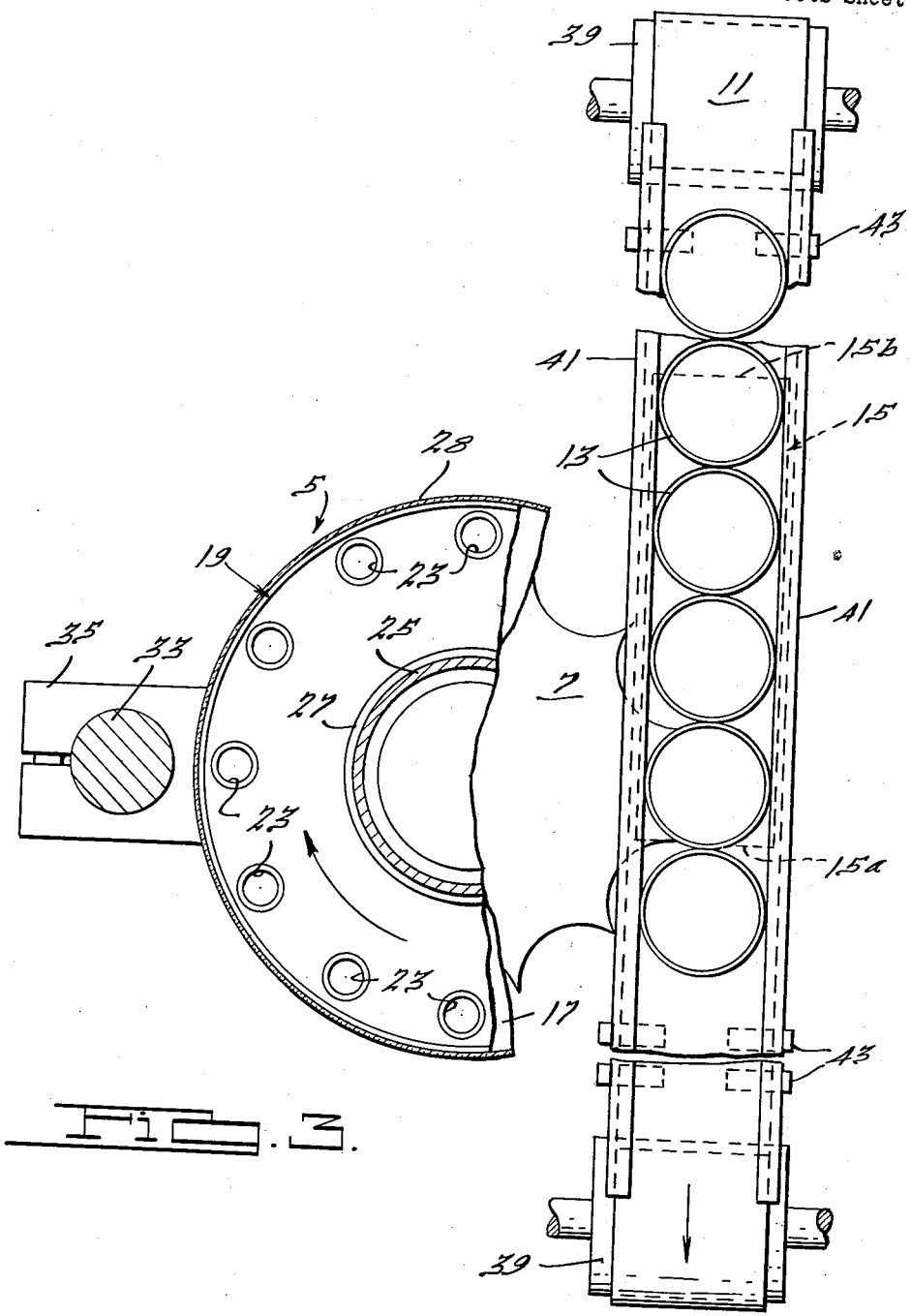
Figure 3 is a horizontal sectional view of the structure of Figure 2 with parts broken away substantially along the line 3—3 thereof.

Briefly and in a broad aspect the invention is embodied in apparatus for measuring and feeding granular material successively into each of a plurality of metal containers moving in a line which comprises, in combination, a measuring and feeding mechanism, means for actuating the measuring and feeding mechanism including a member such as a star wheel movable in succession by the metal containers, conveying and supporting means including a conveyor which has a path of travel adjacent the measuring and feeding mechanism and which includes means to support and move the containers in a line so that they engage and operate the movable actuating member, and magnetic means which magnetically attracts the containers through the conveying and supporting means so that the containers supported thereby and magnetically attracted thereto constitute the driving force for the measuring and feeding mechanism.

Referring now to the particular embodiment of the invention shown in the drawings, the measuring and feeding mechanism is indicated generally at 5 and, per se, is the same as that described in the aforementioned patent. Reference is made to this patent for a detailed description of the construction and operation of the measuring and feeding mechanism 5 constituting but an element of the embodiment of the present invention to be described. As will appear, a fundamental change over the measuring and feeding mechanism in the said patent has been made in accordance with the present invention in that the positive drive therefor has been eliminated and improved driving means has been substituted to the end that the instant invention resides in combination apparatus exemplified by that illustrated. The combination apparatus shown in the drawings includes among other structure in addition to the measuring and feeding mechanism 5 and the star wheel 7 and drive shaft 9 therefor, an endless belt indicated generally at 11 which has a path of travel adjacent the star wheel 7 and which is adapted to support and move a plurality of metal cans 13 in a line so that they each engage and operate the star wheel 7. The apparatus embodying the invention also includes magnet means indicated generally at 15 which is disposed beneath the belt 11 in the vicinity of the star wheel 7 and which magnetically attracts the moving cans through the belt 11.

The details of the particular measuring and feeding mechanism 5 shown do not constitute a part of the present invention except to the extent that broadly the measuring and feeding mechanism must comprise sufficient structure so as to be capable of dispensing a predetermined quantity of salt successively into a plurality of cans as they move in a line upon each actuation thereof by a single can. The particular measuring and feeding mechanism 5, however, has been found to be pre-eminently suited for use in the combination to be described. Sufficient of the structure of the measuring and feeding mechanism 5 to accomplish this is shown in the drawings which includes a stationary plate 17 having a discharge opening 18 therein and rotatably supported on the plate 17, a measuring disc indicated generally at 19 which is rotated by the star wheel 7 through the shaft 9. The measuring disc 19 is formed with an upstanding peripheral flange 21 and is provided with a plurality of circumferentially spaced pockets 23 which are each registrable in succession with the discharge opening 18 positioned over the belt 11. The pockets 23 are filled with granular material, such as salt, sprayed out from the center of the mechanism 5 through the annular opening defined by a stationary vertical tube 25 and a rotating cone element 27 which projects into the tube 25 and which is also rotatably driven by the shaft 9. The tube 25 is enclosed by a glass or plastic shield 28 as shown and extends from and below a hopper 29 provided with a cover 31 which contains a bulk supply of the granular or pelletized salt to be measured and dispensed. The hopper 29 is supported on an upright post 33 by means of a clamp 35 as shown. The post 33 also supports the plate 17 and related structure below the hopper 29 by way of a laterally extending bracket 37.

In operation of the measuring and feeding mechanism 5 when a bulk supply of granular salt is placed in the hopper 29 it travels downwardly through the tube 25 and rests upon the cone element 27. When the star wheel 7 is rotated, for example, in the direction indicated by the arrow in Fig. 3, the cone element 27 is also rotated relative to the tube 25 and the particles of salt are spread radially outwardly therefrom and gathered on the measuring disc 19 which also rotates with the star wheel 7. The granular salt sprayed onto the measuring disc 19 is directed outwardly by a spreader (not shown) to fill the pockets 23 as they approach the post 33 in their movement and before they reach the discharge opening 18 they pass under another spreader (not shown) which scrapes over each of the pockets 23 and thus fixes equally the quantity of salt to be successively dispensed through the discharge opening 18. Continued rotation of the measuring disc 19 brings each of the pockets 23 in register with the opening 18 in succession and the predetermined quantity of salt therein is dropped through the opening 18 into the metal can positioned therebeneath. Each pocket 23 corresponds to a pair of legs on the star wheel 7 so that upon each actuation of the latter by a single container one of the pockets 23 registers with the discharge opening 18.

The endless belt 11 is positioned below the stationary plate 17 and the discharge opening 18 therein at a level such that the cans 13 supported on the belt 11 engage and operate the star wheel 7. The direction of travel of the moving cans 13 is shown by way of example by the arrow in each of Figs. 2, 3 and 4 and as the cans 13 exit from the belt 11 they are fed to an automatic canning machine not shown. The belt 11 is driven by a pair of pulley wheels 39 which in turn are driven by suitable means not shown. As the cans 13 are supported and moved by the belt 11 they are guided on each side by a pair of spaced guide rails 41. Each pair of guide rails 41 is supported above, at one side of and parallel to the belt 11 by suitably spaced vertical members 43, the lower end of each of which is inturned and secured as shown to a horizontal stationary supporting structure 45 disposed below the belt 11. The supporting structure 45 is interrupted over its length as shown to accommodate the stationary magnet means 15 which is likewise positioned beneath the belt 11 as previously mentioned. The magnet means 15 in the instance shown comprises an elongated permanent magnet which is so located that one end thereof, as at 15a, extends in the direction of movement of the cans 13 to a position below that assumed by each pair of legs on the star wheel 7 when it is centered over the discharge opening 18 and embracing a single can 13. The other end of the permanent magnet, as at 15b, extends a sufficient distance opposite to the direction of movement of the cans 13 such that it magnetically attracts them to the belt 11 before they are brough ino position to actuate the star wheel 7.

The magnetic force of attraction from the magnet means 15 must be sufficient to positively hold the cans to the moving belt 11 so that they operate the star wheel 7 without hesitancy and without likelihood of their being tipped or dislodged. In this connection the attractive force between the magnet means 15 and each can must be great enough so that a single can whether it is transported on the belt 11 alone or in a moving series will be capable of actuating the measuring and feeding mechanism 5 through the star wheel 7. The magnetic force attracting the cans to the belt 11, however, must not be so great that the belt cannot move relative to the cans when an opposition force is applied to the moving cans in excess of the resisting force of the star wheel such as would occur when the canning machine was not accepting cans because of temporary shutdown or other difficulty. To provide for this the magnet means 15 with respect to the strength of its field is preselected so that the cans 13 in this instance will remain stationary and the belt 11 will move freely thereunder, thus accomplishing automatic synchronization with the demand of the canning machine. Rollers or similar anti-friction means may be provided between the belt 11 and the magnet means 15 to reduce the frictional drag on the belt when the latter is moved relative to the magnet means 15 and/or the cans 13. It will be appreciated that the magnet means 15 may be in the form of an electro-magnet, the strength of field of which may be adjustable to handle varying lengths of belt and different size cans, and which may be arranged to be energized, for example, in response to the motion of the belt.

The combination apparatus described may be set up at an area remote from the canning machine and in operation, the cans 13 are supported and moved by the belt 11 and no driving force is transmitted through the line of cans themselves. The cans are deposited on the belt 11 in response to the demand of the canning machine by suitable means not shown. After each can is deposited on the belt 11 it is loosely supported thereon in its travel to the star wheel 7 until it reaches the vicinity of the end 15b of the magnet means 15. It is then captured by the lines of flux emanating from the magnet means 15 and is positively attracted to the belt 11, so long as it remains within the influence of these lines of flux. From the end 15b each can moves along with and is positively attracted to the belt 11 above the magnet means 15 until it reaches the first of the pair of legs on the star wheel 7 which project into the path of travel of the belt 11. At this point it is maintained magnetically attracted to the belt 11 and engages and moves the said pair of legs operating the star wheel 7. Simultaneously with the operation of the star wheel 7 a predetermined quantity of salt is dispensed into the can which rotated it by the measuring and feeding mechanism 5 in the manner already described. The filled can is carried beyond the field of the magnet means 15 and the vicinity of the star wheel 7 by the continued movement of the belt 11 to suitable feeding and handling mechanism not shown which delivers it to the automatic canning machine. As previously mentioned, in the event jamming occurs at the canning machine and the plurality of cans are prevented from moving the belt 11 freely moves between the magnet means 15 and the cans 13 and no salt is dispensed during this time until the demand of the canning machine is renewed.

It will be apparent to those skilled in the art that magnet means 15 may be a permanent magnet or an electromagnet. An electro-magnet permits easy variation of the magnetic force to thereby enable adjustment of the degree of attraction of the can to the magnet and thus the force required to cause a line of cans to slide on the belt in the event of jamming of the receiving canning machine. This adjustment feature gives the machine a somewhat wider range of utility since it makes the machine useful for varying sizes of cans and varying weights of material being deposited therein. While magnetic means 15 has been illustrated in Figures 1–4 as a stationary magnet, the magnet means may be satisfactorily in the form shown in Figures 5 and 6. In this modified construction the magnets 47 are directly attached by suitable adhesive or equivalent means to belt 11 and are spaced so as to be centrally located under cans 13 to be delivered to star wheel 7. These magnets are preferably permanent magnets or electro-magnets of any desired shape but should have exterior dimensions such that when disposed centrally of belt 11 they can pass between a pair of spaced pulley wheels 49 which are rigidly attached to and mounted for rotation on shaft 51.

It will thus be seen that there has been provided by the present invention combination apparatus in which the objects hereinabove set forth, together with many practical advantages are successfully achieved. It is to be understood that the invention is susceptible to variation, modification and change without departing from the spirit thereof or from the scope of the appended claims.

What is claimed is:

1. Apparatus for measuring and feeding granular material into successive empty metal containers of a moving series comprising in combination a measuring and feeding mechanism, means for operating said mechanism including a rotatable shaft having a star wheel thereon, smooth belt conveyor means having a path of travel adjacent said mechanism and including supporting structure adapted to support and move said containers in a line so that they engage and effect rotation of said star wheel, and permanent magnet means associated with said conveyor means magnetically attracting the said containers through said conveyor means so that said moving containers supported thereby and magnetically attracted thereto constitute the driving force for said mechanism.

2. Apparatus for measuring and feeding granular salt into successive empty metal cans of a moving series comprising in combination a measuring and feeding mechanism, means for operating said mechanism including a vertically extending rotatable shaft having a star wheel thereon, an endless belt having a path of travel adjacent to said mechanism adapted to support and move the cans in a line at a level such that they engage and effect rotation of said star wheel, and stationary permanent magnet means disposed beneath said belt adjacent said star wheel magnetically attracting them through said belt so that the moving cans supported on said belt and magnetically attracted thereto constitute the driving force for said mechanism.

3. Apparatus for measuring and feeding granular material into successive empty magnet-responsive containers of a moving series comprising in combination a measuring and feeding mechanism, means for operating said mechanism including a vertically extending rotatable shaft having a star wheel thereon, said measuring and feeding mechanism having means including a discharge opening for successively dispensing therethrough a predetermined quantity of salt upon each actuation of said star wheel, an endless belt having a path of travel adjacent to said mechanism adapted to support and move the cans in a line and at a level such that they engage and operate said star wheel, means for guiding the cans as they move along said belt preventing displacement of said cans laterally of said belt, and stationary permanent magnet means disposed beneath said belt adjacent said star wheel magnetically attracting the cans through said belt so that each moving can supported on said belt and magnetically attracted thereto constitutes a driving force for said mechanism.

4. Apparatus for dispensing granular materials into a plurality of empty magnet responsive receptacles and for continuously feeding said receptacles to a canning machine located remotely from said apparatus comprising in combination a dispensing apparatus capable of dispensing measured quantities of granular materials when actuated, means for actuating said dispensing apparatus comprising a rotatable shaft having a plurality of arms extending therefrom, movable means disposed adjacent to said dispensing apparatus and extending to the entry side of said canning machine for supporting a plurality of receptacles, a plurality of receptacles in alignment on said movable means and disposed so as to contact said arms when said movable means is actuated, said movable means having a smooth upper surface means for actuating said movable means, and permanent magnet means magnetically attracting said receptacles to said movable means at least while said receptacles are in contact with said arms, said receptacles constituting the sole actuating means for said dispensing apparatus.

5. Apparatus as claimed in claim 4 wherein the engagement between each said receptacle and said movable means is sufficiently strong to actuate said dispensing apparatus and concurrently to permit said receptacles to slide on said movable means when additional resistance to movement of said receptacles is interposed.

6. Apparatus as claimed in claim 5, wherein said movable means is an endless belt, and said magnetic means is stationary and disposed adjacent to said dispensing apparatus.

7. An apparatus as claimed in claim 4 wherein said magnetic means is attached to said conveyor means and moves therewith.

References Cited in the file of this patent

UNITED STATES PATENTS

| | | |
|---|---|---|
| Re. 21,453 | Bird | May 21, 1940 |
| 1,122,334 | Taylor | Dec. 29, 1914 |
| 1,416,997 | Taylor | May 23, 1922 |
| 1,773,646 | Skov | Aug. 19, 1930 |
| 2,048,124 | Hume | June 21, 1936 |
| 2,276,472 | Eberhart | Mar. 17, 1942 |
| 2,682,334 | Thompson et al. | June 29, 1954 |
| 2,766,043 | Buccicone | Oct. 9, 1956 |
| 2,806,396 | Miller | Sept. 17, 1957 |
| 2,848,098 | Talbot | Aug. 19, 1958 |